(12) United States Patent
Ishikawa et al.

(10) Patent No.: US 10,894,716 B2
(45) Date of Patent: Jan. 19, 2021

(54) METHOD FOR PRODUCING POROUS CARBON MATERIAL

(71) Applicant: Sumitomo Electric Industries, Ltd., Osaka (JP)

(72) Inventors: Shinji Ishikawa, Yokohama (JP); Takahiro Saito, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 142 days.

(21) Appl. No.: 16/305,228

(22) PCT Filed: Apr. 12, 2018

(86) PCT No.: PCT/JP2018/015320
§ 371 (c)(1),
(2) Date: Nov. 28, 2018

(87) PCT Pub. No.: WO2018/190392
PCT Pub. Date: Oct. 18, 2018

(65) Prior Publication Data
US 2019/0233290 A1    Aug. 1, 2019

(30) Foreign Application Priority Data

Apr. 14, 2017 (JP) .................... 2017-080639

(51) Int. Cl.
*C01B 31/02* (2006.01)
*C01B 32/05* (2017.01)
*H01G 11/34* (2013.01)
*H01G 11/26* (2013.01)
*H01G 11/86* (2013.01)
*C01B 32/00* (2017.01)

(52) U.S. Cl.
CPC .............. *C01B 32/05* (2017.08); *C01B 32/00* (2017.08); *H01G 11/26* (2013.01); *H01G 11/34* (2013.01); *H01G 11/86* (2013.01); *C01P 2002/72* (2013.01); *C01P 2006/40* (2013.01); *Y02E 60/13* (2013.01)

(58) Field of Classification Search
CPC ..................................................... C01B 32/05
See application file for complete search history.

(56) References Cited

U.S. PATENT DOCUMENTS

| 3,066,099 | A | 11/1962 | Mohun |
| 6,579,833 | B1 * | 6/2003 | McNallan ......... C04B 35/62884 508/100 |
| 9,266,740 | B2 * | 2/2016 | Ishikawa ................ C01B 32/05 |

FOREIGN PATENT DOCUMENTS

| JP | 02-184511 A | 7/1990 |
| JP | 2004-513529 A | 4/2004 |
| JP | 2010-265134 A | 11/2010 |
| JP | 2016-050127 A | 4/2016 |
| JP | 6011614 B2 | 10/2016 |
| WO | 02/039468 A2 | 5/2002 |

* cited by examiner

*Primary Examiner* — Stuart L Hendrickson
(74) *Attorney, Agent, or Firm* — Baker Botts L.L.P.; Michael A. Sartori

(57) ABSTRACT

Provided is a method for producing a porous carbon material, containing a step of subjecting a mixture containing inorganic carbide particles and inorganic oxide particles to a heat treatment under a chlorine gas atmosphere.

11 Claims, 4 Drawing Sheets

METHOD FOR PRODUCING POROUS CARBON MATERIAL

TECHNICAL FIELD

The present invention relates to a method for producing a porous carbon material.

The present application claims the benefit of priority based on Japanese Patent Application No. 2017-080639, filed on Apr. 14, 2017, and all the discloses contents described in the above-mentioned Japanese Patent Application is incorporated herein by reference.

BACKGROUND ART

Patent Literature 1 to Patent Literature 3 disclose, as a method for forming a porous carbon material, a method of reacting an inorganic carbide such as SiC with chlorine gas according to the reaction represented by the following scheme.

$$SiC + 2Cl_2 \rightarrow C + SiCl_4$$

Patent Literature 4 and Patent Literature 5 disclose a method of forming porous carbon through a halogenation treatment of particles of inorganic carbide (SiC, TiC, etc.) and application of the porous carbon to an electric double-layer capacitor (hereinafter also referred to as "EDLC"). Also, in order to improve performance as the use for an EDLC, there is disclosed an activation treatment by an oxygen-containing compound ($CO_2$, $H_2O$, etc.).

Patent Literature 6 discloses an example of a process of gas activation of a carbon material in a method for producing porous carbon for EDLC.

CITATION LIST

Patent Literature

Patent Literature 1: U.S. Pat. No. 3,066,099
Patent Literature 2: JP-A H02-184511
Patent Literature 3: Japanese Patent No. 6,011,614
Patent Literature 4: JP-T 2004-513529
Patent Literature 5: JP-A 2016-050127
Patent Literature 6: JP-A 2010-265134

SUMMARY OF INVENTION

The method for producing a porous carbon material according to one embodiment of the present invention contains:

a step of subjecting a mixture containing inorganic carbide particles and inorganic oxide particles to a heat treatment under a chlorine gas atmosphere.

DESCRIPTION OF EMBODIMENTS

Figure 1:
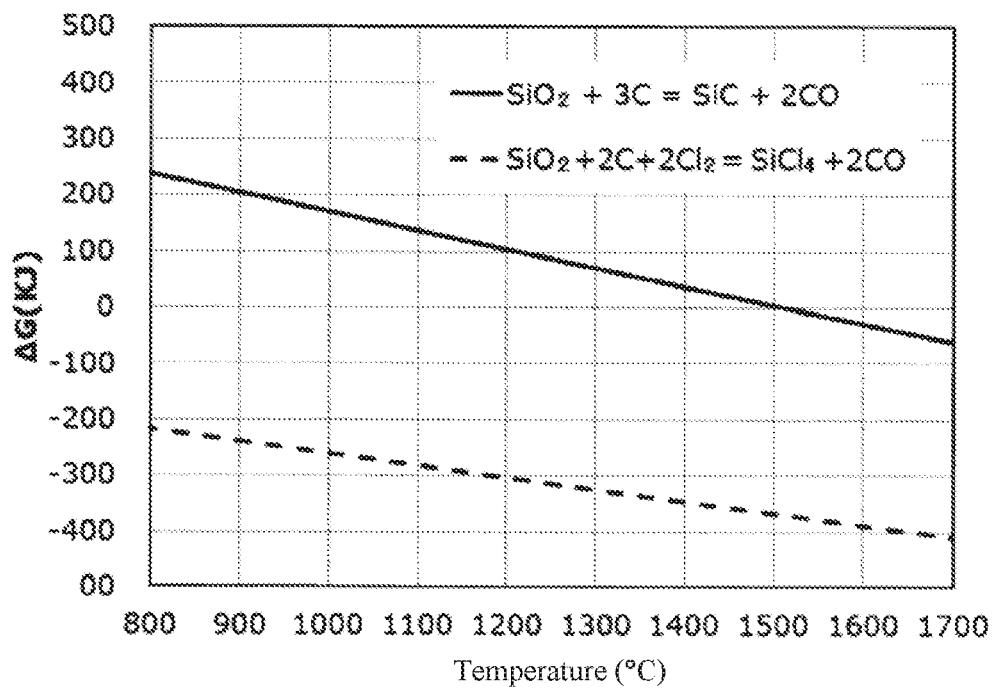
FIG. 1 is a graph showing analysis results on standard free energy of formation (ΔG) of reactions represented by chemical scheme 1 and chemical scheme 2.

Problems that the Disclosure is to Solve

The porous carbon materials disclosed in Patent Literature 1 to Patent Literature 3 have a peak pore diameter, calculated by QSDFT analysis from adsorption isotherms of $N_2$ gas, being so small as about 6 Å, which is comparable to the size of ions in the electrolyte of EDLC. For utilization in EDLC, it is desirable to lower the electric resistance by using a porous carbon material having a larger pore diameter, which does not inhibit diffusion of the ions.

The porous carbon material disclosed in Patent Literature 4 achieves the pore diameter of the porous carbon material, being suitable to the ion size in EDLC in the case where TiC or MoC is used as an inorganic carbide. On the other hand, TiC and MoC are carbides containing expensive metal elements. Therefore, the use thereof as a starting material leads to an increase in production cost.

In the porous carbon materials disclosed in Patent Literature 5 and Patent Literature 6, the pore diameter of the porous carbon materials is increased by performing an activation treatment after a treatment with chlorine gas. On the other hand, the activation treatment should be performed as a separate step from the chlorination treatment, so that the production cost increases also due to the loss resulting from a weight decrease of the porous carbon materials by the activation treatment.

The present disclosure was made in view of such problems and an object thereof is to provide a method for producing a porous carbon material that has a large pore diameter and is capable of forming a low-resistance electrode, through one step of a chlorine gas treatment step without performing an activation treatment step.

Advantage of the Disclosure

According to the present disclosure, there can be provided a method for producing a porous carbon material that has a large pore diameter and is capable of forming a low-resistance electrode, through one step of a chlorine gas treatment step without performing an activation treatment step.

Explanation of Embodiments of the Present Invention

First, the contents of embodiments of the present invention are listed and explained.

The method for producing a porous carbon material according to the embodiment of the present invention contains:

(1) a step of subjecting a mixture containing inorganic carbide particles and inorganic oxide particles to a heat treatment under a chlorine gas atmosphere.

According to this configuration, a porous carbon material having a large pore diameter and capable of forming a low-resistance electrode can be provided by one step of a chlorine gas treatment step without performing an activation treatment step.

(2) In the method for producing a porous carbon material according to the above (1), the inorganic oxide particles preferably have an average particle diameter of smaller than 20 nm.

According to this configuration, points of contact reaction between the inorganic carbide particles and the inorganic oxide particles increase and a porous carbon material having a suitable pore diameter as an electrode material can be obtained.

(3) In the method for producing a porous carbon material according to the above (1), the inorganic oxide particles preferably have an average particle diameter of smaller than 15 nm.

According to this configuration, points of contact reaction between the inorganic carbide particles and the inorganic oxide particles further increase and a porous carbon material having a more suitable pore diameter as an electrode material can be obtained.

(4) In the method for producing a porous carbon material according to the above (1), the inorganic oxide particles preferably have an average particle diameter of larger than 8 nm.

In the case where the average particle diameter of the inorganic oxide particles is too small, there is a possibility that sintering of $SiO_2$ particles proceeds before the reaction and there are concerns of a decrease in contact points with carbon and a blockage of the reaction with chlorine by $SiO_2$ formed on the surface.

(5) In the method for producing a porous carbon material according to any one of the above (1) to (4), the heat treatment is preferably performed at 1,000° C. or higher.

According to this configuration, the decomposition reaction of the inorganic oxide is prone to occur and a porous carbon material having a suitable pore diameter as an electrode material can be obtained.

(6) In the method for producing a porous carbon material according to any one of the above (1) to (4), the heat treatment is preferably performed at 1,000° C. or higher and 1,300° C. or lower.

According to this configuration, the decomposition reaction of the inorganic oxide is prone to occur and the contraction of the pores due to sintering of the porous carbon material does not start, so that a porous carbon material having a more suitable pore diameter as an electrode material can be obtained.

(7) In the method for producing a porous carbon material according to any one of the above (1) to (6), it is preferable that the inorganic carbide is SiC and the inorganic oxide is $SiO_2$.

According to this configuration, the formation of carbon from the inorganic carbide is prone to proceed and the reaction of the inorganic oxide with the formed carbon is prone to proceed, so that a porous carbon material having a suitable pore diameter as an electrode material can be obtained in high yields and for a short period of time.

(8) In the method for producing a porous carbon material according to any one of the above (1) to (6), it is preferable that the inorganic carbide is SiC and the inorganic oxide is amorphous $SiO_2$.

According to this configuration, the formation of carbon from the inorganic carbide is prone to proceed and the reaction of the inorganic oxide with the formed carbon is prone to proceed, so that a porous carbon material having a suitable pore diameter as an electrode material can be obtained in high yields and for a short period of time. Also, since the structure of $SiO_2$ is amorphous, the proceeding of the reaction is accelerated and the porous carbon material can be obtained for a further short period of time.

(9) In the method for producing a porous carbon material according to the above (7) or (8), SiC preferably has a particle diameter of 5 μm or less.

According to this configuration, the activation effect owing to the oxide particles permeates into the inside of the particles, and pores that contribute to electrolyte ion migration are formed to the inside of the particles, so that it is possible to reduce the resistance of EDLC using the obtained porous carbon.

(10) In the method for producing a porous carbon material according to any one of the above (7) to (9), it is preferable that SiC has a β-type crystal structure and SiC has a specific surface area calculated by BET method from its nitrogen adsorption isotherm being 10 $m^2/g$ or more.

In the case where the crystal structure of SiC is β type, a porous carbon material having a large pore diameter can be obtained as compared with the case where SiC having an α-type crystal structure is used. Therefore, the amount of pores capable of adsorbing electrolyte ions increases per unit weight, which provides effects on an increase in the static capacity of EDLC and a reduction in the resistance. Moreover, since the specific surface area is controlled to 10 $m^2/g$ or more, the particle diameter becomes sufficiently small and, in the case of the use as an electrode material for EDLC, the distance from the particle surface to the central part decreases. Therefore, the diffusion distance of ions decreases and thus the resistance can be reduced.

(11) In the method for producing a porous carbon material according to any one of the above (1) to (10), it is preferable that the mixture contains the inorganic oxide in a ratio of 2 mol % or more and 12 mol % or less relative to the total of mass amounts of the inorganic carbide and the inorganic oxide in the mixture.

According to this configuration, the pore volume of the porous carbon material does not become exceedingly large, and a porous carbon material capable of forming an electrode having a low resistance and a capacitor having excellent static capacity can be obtained.

(12) In the method for producing a porous carbon material according to any one of the above (1) to (10), it is preferable that the mixture contains the inorganic oxide in a ratio of 3 mol % or more and 8 mol % or less relative to the total of mass amounts of the inorganic carbide and the inorganic oxide in the mixture.

According to this configuration, the pore volume of the porous carbon material does not become exceedingly large, and a porous carbon material capable of forming an electrode having a further low resistance and a capacitor having excellent static capacity can be obtained.

DETAILS OF EMBODIMENTS OF THE PRESENT INVENTION

Hereinafter, the embodiments of the present invention will be explained in detail.

The method for producing a porous carbon material according to the embodiment includes a step of subjecting a mixture containing inorganic carbide particles and inorganic oxide particles to a heat treatment under a chlorine gas atmosphere.

(Inorganic Carbide Particles)

As the inorganic carbide particles, use can be made of at least one of $Al_4C_3$, $B_4C$, $CaC_2$, $Cr_3C_2$, $Fe_3C$, SiC, $ThC_2$, TiC, $UC_2$, WC, and MoC. Of these, SiC is preferably used.

In the case of using SiC as the inorganic carbide particles, the particle diameter of SiC is preferably 5 μm or less. According to this configuration, the activation effect owing to the oxide particles permeates into the inside of the particles, and pores that contribute to electrolyte ion migration are formed to the inside of the particles, so that it is possible to reduce the resistance of EDLC using the obtained porous carbon. Contrarily, in the case where the particle diameter of SiC is larger than 5 μm, the activation effect owing to the oxide particles does not permeate into the inside of the particles, and pores contributing to electrolyte ion migration are less prone to be formed to the inside of the particles, so that there is a possibility of an increase in the resistance of EDLC.

Moreover, SiC preferably has a β-type crystal structure. In the case of using SiC having a β-type crystal structure, the pore diameter of the resulting porous carbon material can be made large as compared with the case of SiC having an α-type crystal structure. Therefore, the amount of pores capable of adsorbing electrolyte ions increases per unit weight, which provides effects on an increase in the static capacity of EDLC and a reduction in the resistance.

The inorganic carbide particles preferably has a specific surface area calculated by BET method from nitrogen adsorption isotherm being 10 m²/g or more. In the case where the specific surface area is controlled to 10 m²/g or more, the particle diameter becomes sufficiently small and, in the case of the use as an electrode material for EDLC, the distance from the particle surface to the central part decreases. Therefore, the diffusion distance of ions decreases and thus the resistance can be reduced.

(Inorganic Oxide Particles)

As the inorganic oxide particles, at least one of $SiO_2$, $TiO_2$, $B_2O_3$, $Fe_2O_3$, and the like can be used. Of these, $SiO_2$ is preferably used.

In the case of using $SiO_2$ as the inorganic oxide, $SiO_2$ is preferably amorphous. In the case where amorphous $SiO_2$ is used, the proceeding of the reaction is accelerated and the porous carbon material can be obtained for a short period of time.

The inorganic oxide particles have an average particle diameter of preferably smaller than 20 nm, and further preferably smaller than 15 nm. Such a small average particle diameter of the inorganic oxide particles can increase points of contact reaction between the inorganic carbide particles and the inorganic oxide particles, and a porous carbon material having a suitable pore diameter as an electrode material can be obtained. Moreover, the inorganic oxide particles preferably have an average particle diameter of larger than 8 μm. In the case where the average particle diameter of the inorganic oxide particles is too small, there is a possibility that sintering of $SiO_2$ particles proceeds before the reaction and there are concerns of a decrease in contact points with carbon and a blockage of the reaction with chlorine by $SiO_2$ formed on the surface. Incidentally, the "average particle diameter" herein means a primary particle diameter determined, in terms of sphere, from the specific surface area that has been determined by gas adsorption method.

The mixture of the inorganic carbide particles and the inorganic oxide particles contains the inorganic oxide preferably in a ratio of 2 mol % or more and 12 mol % or less, and contains the inorganic oxide further preferably in a ratio of 3 mol % or more and 8 mol % or less, relative to the total of mass amounts of the inorganic carbide particles and the inorganic oxide particles in the mixture. In the case where the inorganic oxide is contained in such a ratio, the pore volume of the resulting porous carbon material does not become exceedingly large, and a porous carbon material capable of forming an electrode having a low resistance and a capacitor having excellent static capacity can be obtained.

(Heating Treatment)

The heat treatment according to the present embodiment is performed in the presence of chlorine gas and may be performed under a mixed atmosphere of chlorine and an inert gas such as chlorine/nitrogen. Moreover, the heat treatment is preferably performed at 900° C. or higher, and further preferably at 1,000° C. or higher. In the case where the temperature range is controlled as such, the decomposition reaction of the inorganic oxide is prone to occur and a porous carbon material having a suitable pore diameter as an electrode material can be obtained. In addition, the treatment is preferably performed at 1,500° C. or lower, and further preferably at 1,300° C. or lower. In the case where the temperature range is controlled as such, the contraction of the pores due to sintering of the porous carbon material does not start, so that a porous carbon material having a more suitable pore diameter as an electrode material can be obtained.

Here, analysis of the present reaction by thermodynamic equilibrium in the case where SiC is used as the inorganic carbide particles and $SiO_2$ is used as the inorganic oxide particles, will be described as a reference. When it is assumed that $SiO_2$ reacts with the porous carbon material to be formed, the following two reactions are conceivable.

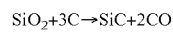

$SiO_2 + 3C \rightarrow SiC + 2CO$ (Chemical Scheme 1)

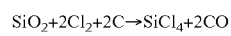

$SiO_2 + 2Cl_2 + 2C \rightarrow SiCl_4 + 2CO$ (Chemical Scheme 2)

FIG. 1 shows results of analysis on standard free energy of formation (ΔG) of reactions represented by Chemical Scheme 1 and Chemical Scheme 2. In the case of the reaction represented by Chemical Scheme 1, the reaction does not spontaneously proceed unless the temperature is 1,500° C. or higher at which ΔG becomes negative. However, in the case of the reaction represented by Chemical Scheme 2, ΔG is negative in the range of the temperature being 800° C. or higher and it is surmised that the reaction may proceed spontaneously at a lower temperature as compared with the reaction represented by Chemical Scheme 1.

From the above analysis results, it is surmised that it becomes possible to make the two reactions shown below proceed by subjecting the mixture using SiC as the inorganic carbide particles and $SiO_2$ as the inorganic oxide particles to a heat treatment under a chlorine gas atmosphere.

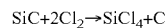

$SiC + 2Cl_2 \rightarrow SiCl_4 + C$ (Chemical Scheme 3)

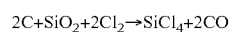

$2C + SiO_2 + 2Cl_2 \rightarrow SiCl_4 + 2CO$ (Chemical Scheme 2)

The reaction represented by Chemical Scheme 3 is a reaction of the inorganic carbide particles and chlorine gas, and micro-pores having a pore diameter of from about 5 to 10 Å are formed by this reaction. The reaction represented by Chemical Scheme 2 is a reaction in which the carbon material is consumed (etched) by the inorganic oxide particles and, although there has been no report with regard to the production of carbide-derived carbon hitherto, it is considered that pores having a pore diameter of from about 20 to 40 Å are formed thereby. This pore diameter is a size that is several times that of electrolyte ions in a capacitor and thus, facilitates the migration of the electrolyte ions in the pores of the porous carbon material. Therefore, in the case where a porous carbon material having such pores is used as an electrode of a capacitor such as EDLC, an effect of a reduction in the resistance can be expected.

Incidentally, as a reason why the reaction represented by Chemical Scheme 2 has not been reported with regard to the production of carbide-derived carbon hitherto, it is considered that since release of oxygen, accompanied with a chlorination of the inorganic oxide particles through the heat treatment under a chlorine gas atmosphere, is necessary, the reaction is not investigated experimentally. However, since $SiO_2$ and $Cl_2$ do not directly react with each other, decomposition of $SiO_2$ is necessary. Therefore, it is considered that the reduction reaction of $SiO_2$ through extraction of oxygen at a contact site with carbon and the reaction of a reduced species with chlorine gas suitably proceed at 1,000° C. or higher, and thus increases in the specific surface area and the pore amount is provided. The following show four kinds of reactions that are considered to be elementary reactions.

$$SiO_2 \rightarrow SiO + \tfrac{1}{2}O_2 \quad \text{(Chemical Scheme 2A)}$$

$$\tfrac{1}{2}O_2 + C \rightarrow CO \quad \text{(Chemical Scheme 2B)}$$

$$SiO + 2C \rightarrow SiC + CO \quad \text{(Chemical Scheme 2C)}$$

$$SiC + 2Cl_2 \rightarrow SiCl_4 + C \quad \text{(Chemical Scheme 2D)}$$

Such reactions are not inherent in the $SiC$—$SiO_2$ system and are also possible in $TiC$—$TiO_2$. Although the reactions are also applicable to other oxides, an oxide that is spontaneously chlorinated by the reaction with carbon (e.g., an alkali oxide) is possibly unsuitable because there is a possibility that the etching reaction of carbon does not suitably proceed.

Moreover, also in the case where the inorganic carbide particles and the inorganic oxide particles are different, similar reactions can be considered and, for example, a mixture such as $WC$—$SiO_2$, $MoC$—$SiO_2$, $Al_4C_3$—$SiO_2$, or $B_4C$—$SiO_2$ may be used. Particularly, $SiO_2$ is suitable as a mixed oxide since the production of nano-sized ultrafine particles is easy and the price is relatively inexpensive (e.g., Aerosil (registered trademark) 200, 300, 380, etc., manufactured by Nippon Aerosil Co., Ltd., has an average particle diameter of 20 nm or less).

In addition, as SiC, it is preferred to use SiC particles having a particle diameter of 5 μm or less. In this case, the activation effect owing to the oxide particles permeates into the inside of the particles, and pores that contribute to electrolyte ion migration are formed to the inside of the particles, so that it is possible to contribute to a reduction in the resistance of EDLC using the obtained porous carbon. Furthermore, in the case of using a raw material in which SiC is composed of primary particles having a β-type crystal structure and an average particle diameter of 0.5 μm or less, the pore peak width of the porous carbon material is prone to become about 8 Å, which is larger than the ion size of an organic ammonium salt that is an electrolyte for EDLC, so that in the case where the porous carbon material is used as an electrode of a capacitor such as EDLC, it can contribute to a reduction in the electric resistance.

(Porous Carbon Material)

The porous carbon material obtained by the production method according to the present embodiment (hereinafter also simply referred to as "porous carbon material according to the present embodiment") is not particularly limited as long as it can be used as an electrode material for a capacitor such as EDLC. The average pore diameter thereof is preferably larger than 6.0 Å, and further preferably 7.0 Å or larger. The average pore diameter of 6.0 Å or small may be smaller than the size of the electrolyte ions in the capacitor such as EDLC in some cases, and there is a possibility of increasing the resistance of EDLC. Also, the average pore diameter is preferably 40 Å or small, further preferably 20 Å or small, and particularly preferably 10 Å or small. In the case where the average pore diameter is larger than 40 Å, there may be a case where pores that do not contribute to an increase in the static capacity of the capacitor increase to lower the static capacity. Incidentally, the average pore diameter in the present description means peak pore diameter in pore distribution derived by QSDFT method from nitrogen adsorption isotherm. The QSDFT method is an abbreviation of Quenched Solid Density Generic Function Theory, and is a procedure capable of faithfully obtaining pore distribution to micro-pores and meso-pores by considering heterogeneous pore surfaces through introduction of multi-component DFT. Specifically, it can be calculated by a procedure disclosed in Langmuir 22 (2006), p 11171.

Moreover, the porous carbon material according to the present embodiment preferably has a specific surface area of 1,000 $m^2/g$ and preferably 2,000 $m^2/g$ or less. Also, the porous carbon material according to the present embodiment preferably has a pore volume of 0.5 cc/g or more and preferably 1.0 cc/g or less.

The porous carbon material according to the present embodiment can be used as a material for an electric double-layer capacitor electrode, a redox-capacitor electrode, or a hybrid capacitor electrode, and especially, is preferably used as a material for an electric double-layer capacitor electrode. The use of the porous carbon material according to the present embodiment can provide a capacitor that can reduce the resistance while keeping a large static capacity without performing any activation treatment.

An electrode for a capacitor can be, for example, obtained by mixing and kneading a porous carbon material according to the present embodiment, a conductivity-imparting agent, a binder, and the like, further adding a solvent thereto to prepare a paste, applying the paste onto a current-collecting plate such as an aluminum foil, and subsequently drying to remove the solvent.

In this case, the porous carbon material according to the present embodiment is preferably granular one. Particularly, from the viewpoint of mixing and kneading workability at the time of electrode formation, a porous carbon material having such a desirable particle diameter may be obtained by pulverizing a porous carbon material. The pulverization can be performed by means of a known pulverizer such as a corn crasher, a double-roll crasher, a disk crasher, a rotary crasher, a ball mill, a centrifugal roll mill, a ring roll mill, or a centrifugal ball mill. Moreover, grain distribution may be controlled by further using a classifier in combination. In order to prevent the oxidation of the porous carbon material surface during the pulverization, the pulverization is preferably conducted under an oxygen-free atmosphere.

As the conductivity-imparting agent, acetylene black, Ketjen black, and the like can be used. As the binder, use can be made of fluoropolymer compounds such as polytetrafluoroethylene and polyvinylidene fluoride, carboxymethyl cellulose, styrene-butadiene rubber, petroleum pitch, phenol resin, and the like.

A capacitor such as an electric double-layer capacitor generally has a structure in which electrodes, an electrolyte, a separator, and the like are included as main components and the separator is disposed between a pair of the electrodes. Examples of the electrolyte include electrolytes in which an amidine salt is dissolved in an organic solvent such as propylene carbonate, ethylene carbonate, or methyl ethyl carbonate; electrolytes in which a quaternary ammonium, a tetrafluoroborate salt or hexafluorophosphate salt of an alkali metal such as lithium is dissolved; electrolytes in which a quaternary phosphonium salt is dissolved; and the like. Moreover, examples of the separator include non-woven fabrics, cloths, fine pore films, and the like composed of cellulose, glass fibers, or a polyolefin such as polyethylene or polypropylene as a main component.

EXAMPLES

The following will explain the present invention further in detail with showing results of evaluation tests using Examples according to the present invention. Incidentally, the present invention should not be construed as being limited to these Examples.

1. Production of Porous Carbon Material (Part 1)

Figure 2:
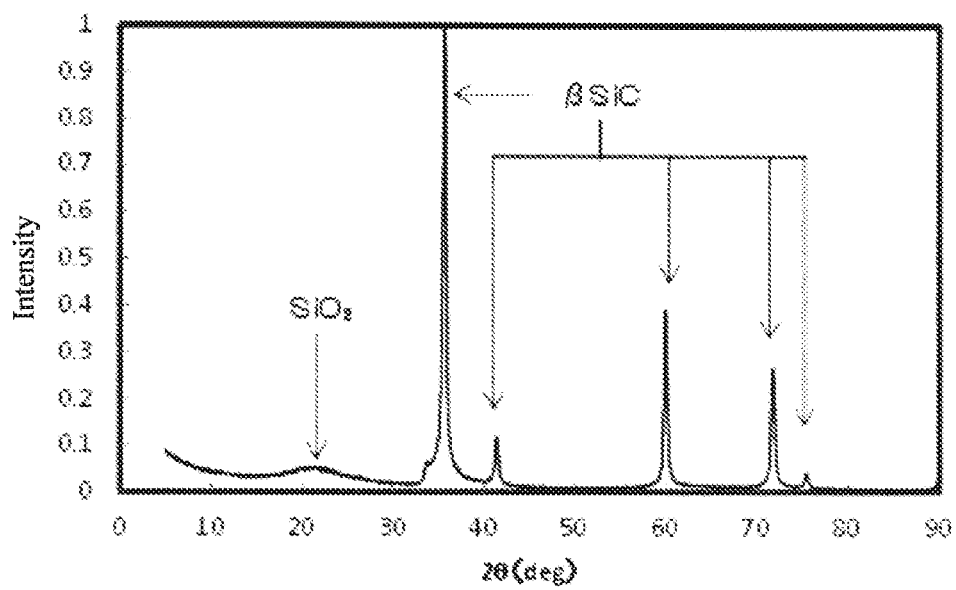
FIG. 2 is a graph showing an X-ray diffraction spectrum of βSiC used in Examples 1 to 5.

Example 1

βSiC manufactured by Nakamura Choukou Co., Ltd. was used as a raw material, which had been produced in the manner as described in JP-A 2015-224142 in which silicon grinding wastes and carbon black were blended and mixed in a prescribed ratio, followed by a thermal treatment under an argon (Ar) atmosphere, and the residual carbon component was subjected to a combustion treatment in the atmospheric air at from 500 to 600° C. FIG. 2 shows an X-ray diffraction spectrum of the raw material measured at a measuring angle being in a range of from 5 to 900 and by using CuKα as a light source. From this measurement, it was confirmed that the raw material was a mixture of βSiC and amorphous $SiO_2$ and the composition was $SiC:SiO_2$=90:10 in terms of molar ratio. In addition, 0.1 g of the raw material was dried in vacuo at 200° C. and was evaluated on a nitrogen adsorption apparatus (NOVA1200, manufactured by QuantaChrome Company) to obtain a nitrogen adsorption isotherm. The specific surface area calculated from the obtained nitrogen adsorption isotherm by BET method was 16 $m^2/g$ and the particle diameter calculated from the specific surface area was about 0.25 μm.

The above-described βSiC was subjected to a heat treatment at 900° C. under a chlorine gas atmosphere for 2 hours to obtain a porous carbon material of Example 1. Then, 0.1 g of the resulting porous carbon material was dried in vacuo at 200° C. and was evaluated on a nitrogen adsorption apparatus (NOVA1200 manufactured by QuantaChrome Company) to obtain a nitrogen adsorption isotherm. The specific surface area and the volume of pores of 40 Å or less of the porous carbon material were calculated from the obtained nitrogen adsorption isotherm by BET method and QSDFT method. Moreover, the porous carbon material was subjected to a heat treatment at 600° C. in the atmospheric air until carbon was completely combusted and removed, and $SiO_2$ that remained in the heat treatment under the chlorine gas atmosphere was recovered and the weight thereof was measured, thereby calculating the residual ratio of $SiO_2$ contained in the raw material.

Example 2 to Example 5

Porous carbon materials of Example 2 to Example 5 were obtained according to the same method as in Example 1 except that the above-described βSiC was subjected to a heat treatment for 2 hours under a chlorine gas atmosphere at 1,000, 1,100, 1,200, and 1,300° C., respectively, and the specific surface area, the volume of pores of 40 Å or less, and the residual ratio of $SiO_2$ were evaluated.

Figure 3:
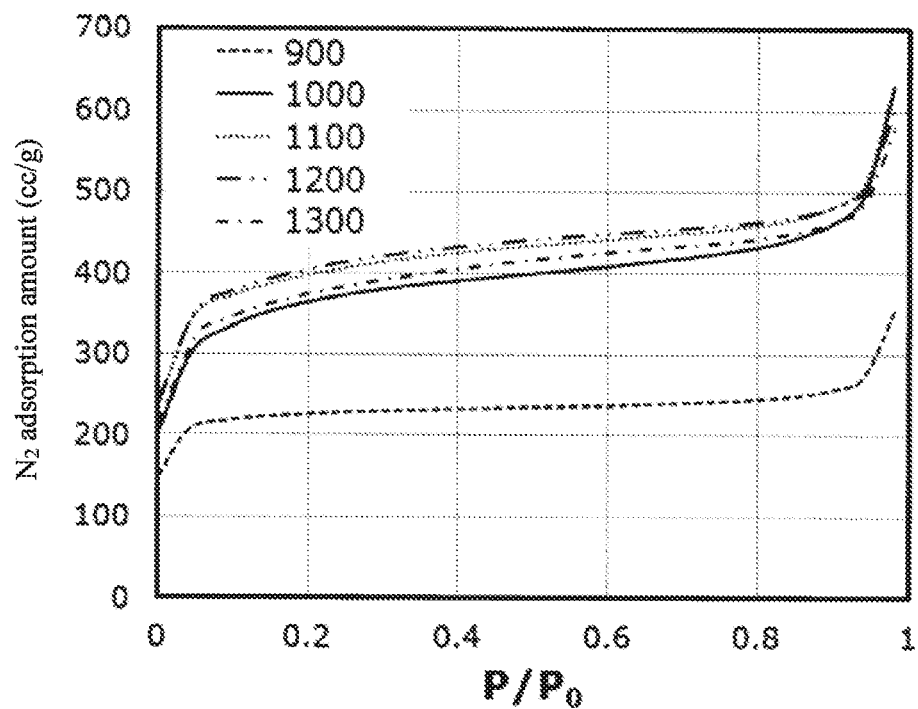
FIG. 3 is a graph showing nitrogen adsorption isotherms of porous carbon materials according to Examples 1 to 5.
Figure 4:
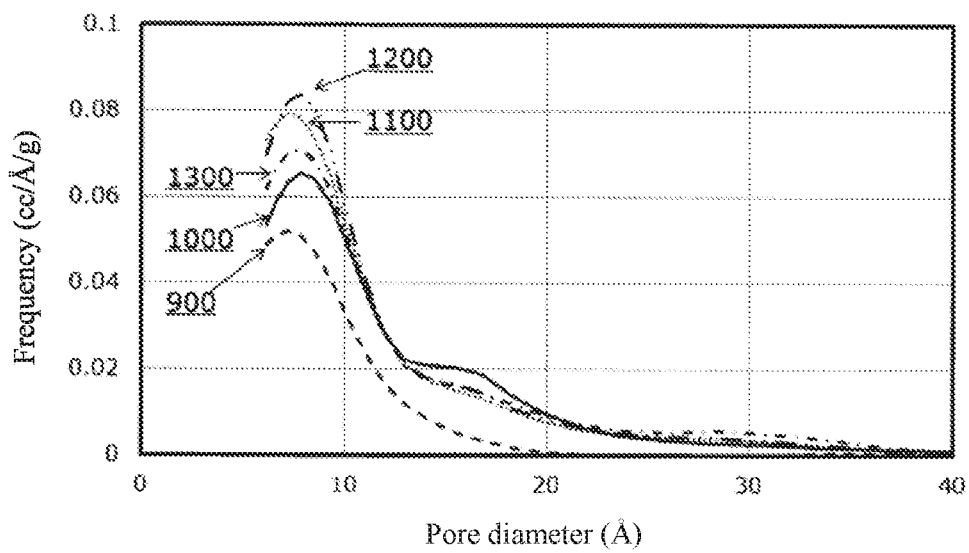
FIG. 4 is a graph showing results of micro-pore analysis performed by QSDFT method from nitrogen adsorption isotherms of porous carbon materials according to Examples 1 to 5.
Figure 5:
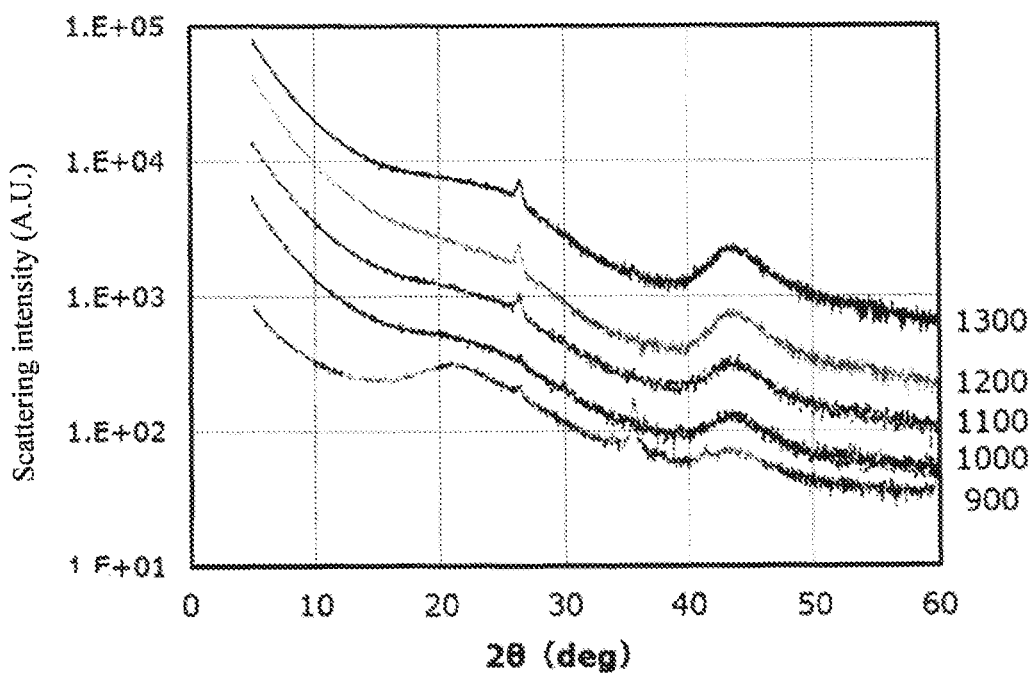
FIG. 5 is a graph showing X-ray diffraction spectra of porous carbon materials according to Examples 1 to 5.

Table 1 shows the specific surface area, the volume of pores of 40 Å or less and the residual ratios of $SiO_2$ of the porous carbon materials of Example 1 to Example 5. Furthermore, FIG. 3 shows the nitrogen adsorption isotherms of the porous carbon materials of Example 1 to Example 5 and FIG. 4 shows pore frequency distribution curves by QSDFT method. Moreover, FIG. 5 shows X-ray diffraction spectra of the porous carbon materials of Example 1 to Example 5 measured at a measuring angle being in a range of from 5 to 900 and by using CuKα as a light source.

TABLE 1

|  | Specific surface area [$m^2/g$] | Pore volume [cc/g] | $SiO_2$-residual ratio [mol %] |
|---|---|---|---|
| Example 1 | 860 | 0.33 | 7.2 |
| Example 2 | 1,320 | 0.57 | 1.9 |
| Example 3 | 1,450 | 0.62 | 0.4 |
| Example 4 | 1,490 | 0.64 | <0.1 |
| Example 5 | 1,360 | 0.61 | <0.1 |

Figure 6:
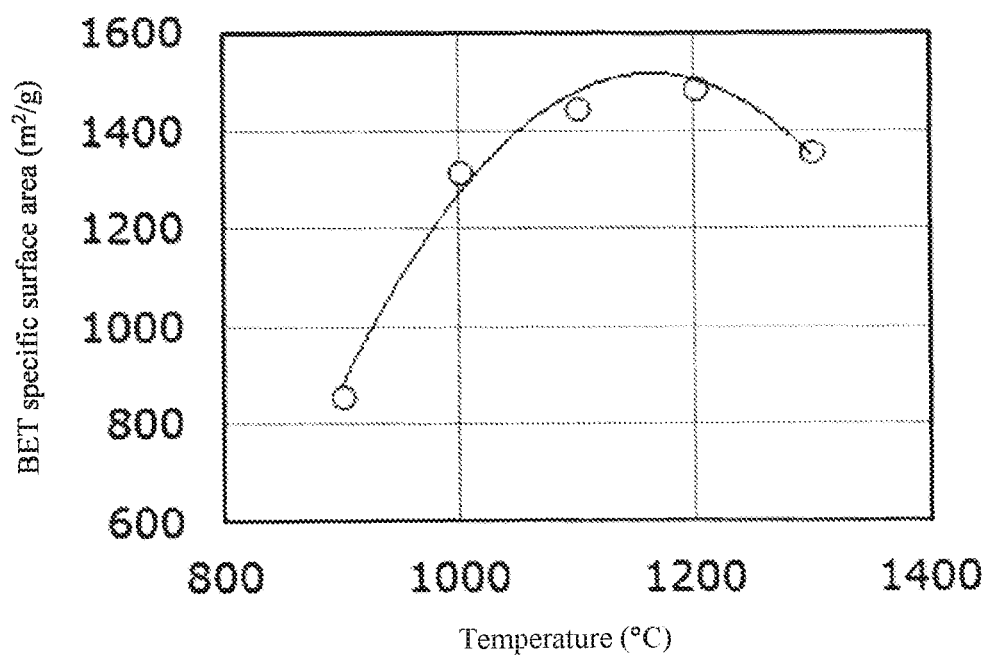
FIG. 6 is a graph showing a relationship between heat treatment temperature under a chlorine gas atmosphere and specific surface area of porous carbon materials in Examples 1 to 5.

From Table 1, FIG. 3 and FIG. 4, it was confirmed that porous carbon materials having a large pore volume were obtained in one step of the heat treatment under a chlorine gas atmosphere without performing any activation treatment step, and also that in pore distribution, a peak appeared around 8 Å. Incidentally, from FIG. 4, in Examples 2 to 5 where the heat treatment was conducted at 1,000° C. or higher, peaks were confirmed around 15 Å and around 30 Å. Moreover, from FIG. 5, a remaining peak derived from SiC, which was observed around a diffraction angle of 35°, was observed at the heat treatment of 900° C. and an increase in small angel scattering at a diffraction angle of 10° or less was confirmed at the heat treatments of 1,000° C. or higher. FIG. 6 is a graph showing specific surface area of porous carbon materials to heat treatment temperature and it was confirmed that the specific surface area increases up to about 1,500 $m^2/g$ with the increase in pore volume until a reaction temperature of 1,200° C. and slightly decreases at 1,300° C.

Figure 7:
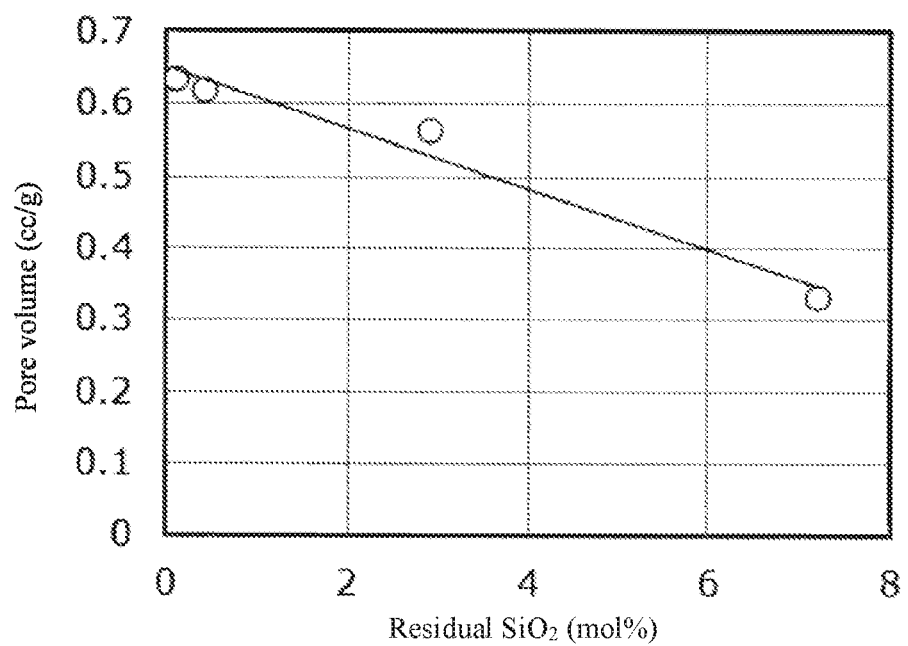
FIG. 7 is a graph showing a relationship between $SiO_2$-residual ratio and pore volume in porous carbon materials of Examples 1 to 4.

As one cause of the results, the $SiO_2$-residual ratio is considered. FIG. 7 is a graph showing a relationship between the $SiO_2$-residual ratio and the pore volume in Examples 1 to 4. Form this graph, it can be confirmed that the pore volume strongly correlates to the $SiO_2$-residual ratio in a region of from 900 to 1,200° C. and it is considered that the oxygen gas generated at the time of combustion of $SiO_2$ activates the porous carbon material. Incidentally, the specific surface area calculated by BET method from the nitrogen adsorption isotherm of $SiO_2$ that remained after the treatment at 900° C. was 150 $m^2/g$ and the particle diameter in terms of sphere was from 17 to 18 nm.

2. Evaluation of Static Capacity and AC Resistance of Electric Double-Layer Capacitor Using Porous Carbon Material (Part 1)

Example 6

The porous carbon material of Example 2, a polytetrafluoroethylene (PTFE) binder, and a Ketjen black conductive aid were each weighed in a mass ratio of 86:7:7. After the porous carbon material and the Ketjen black conductive aid were mixed in a mortar with adding a suitable amount of isopropyl alcohol, the PTFE binder was added thereto and the whole was mixed and kneaded. Isopropyl alcohol was further added thereto, and the whole was mixed and kneaded by means of a twin roll and formed into a sheet electrode having a thickness of 70 µm. The sheet electrode was adhered to an aluminum foil that is a current-collecting plate through a conductive paste. Two sheets of the adhered ones were prepared and a cellulose separator having a thickness of 40 µm was sandwiched therewith to form a cell. A propylene carbonate solution of 1.4M-triethylmethylammonium tetrafluoroborate (TEMA-BF$_4$) was injected into the cell to manufacture an electric double-layer capacitor of Example 6.

Example 7

An electric double-layer capacitor of Example 7 was manufactured in the same manner as in Example 6 except that the porous carbon material of Example 3 was used.

Example 8

An electric double-layer capacitor of Example 8 was manufactured in the same manner as in Example 6 except that a commercially available porous carbon material for EDLC obtained by steam-activating an active carbon made from a coconut shell (a porous carbon material YP50, manufactured by Kuraray Chemical Co., Ltd., specific surface area: 1,640 m$^2$/g, pore volume: 0.8 cc/g) was used.

Example 9

An electric double-layer capacitor of Example 9 was manufactured in the same manner as in Example 6 except that a commercially available porous carbon material for EDLC obtained by steam-activating an active carbon made from a coconut shell (a porous carbon material YP80, manufactured by Kuraray Chemical Co., Ltd., specific surface area: 2,350 m$^2$/g, pore volume: 1.1 cc/g) was used.

Example 10

Used was a porous carbon material prepared by using otSiC (purity 98%), manufactured by Kojundo Chemical Laboratory Co., Ltd., as a raw material without an activation treatment step. The resulting carbon material had a specific surface area of 1,250 m$^2$/g and a pore volume of 0.5 cc/g. An electric double-layer capacitor of Example 10 was manufactured in the same manner as in Example 6.

The charge and discharge terminals of a charge and discharge apparatus were connected to the current-collecting plates of each of the electric double-layer capacitors of Example 6 to Example 10, constant-current charge at 40 mA was performed until the voltage between the current-collecting plates reached 2.5 V, and subsequently charge was performed at a constant volume of 2.5 V for 30 minutes. After the charge, the electric double-layer capacitor was discharged at a constant current (discharge current: 10 mA). At this time, discharge times t1 and t2 required until the voltage between the current-collecting plates reached V1 and V2 were measured, respectively, and static capacity was determined by using the following Equation (1). The resulting static capacity was divided by the mass of the porous carbon material contained in the electrodes for the capacitor, to calculate mass-based static capacity (F/g). Moreover, in the state that the voltage between the current-collecting plates was elevated to 2.5V, AC resistance was measured at a voltage amplitude of 10 mV within a frequency range of from 0.1 Hz to 20 kHz. Incidentally, as for the voltage measurement for the calculation of the static capacity and the AC resistance measurement, measurements were performed under two kinds of conditions of measurement temperatures of 25° C. and −30° C.

$$\text{Static Capacity (mAh)}=(t2-t1)\times\text{charge current (mA)} \quad \text{Equation (1):}$$

Table 2 shows the static capacity and the AC resistance determined at the condition of 25° C. and Table 3 shows the static capacity and the AC resistance determined at the condition of −30° C. In the electric double-layer capacitors of Example 6 and Example 7, an increase in the static capacity at ordinary temperature and a reduction in the AC resistance were confirmed. Moreover, in the electric double-layer capacitors of Example 6 and Example 7, the AC resistance at the low temperature shows a sufficiently small value as compared with the electric double-layer capacitors of Example 8 and Example 9 in which a porous carbon material subjected to a gas-activation treatment was used, and thus it was confirmed that satisfactory properties are exhibited as an electric double-layer capacitor. Furthermore, the capacitor of Example 10 in which an activation treatment was not performed and the porous carbon material was produced by using no inorganic oxide particles exhibited low static capacity and high AC resistance as compared with the cases of Example 6 and Example 7.

TABLE 2

|  | Static capacity [F/g] | AC resistance [Ω] |
|---|---|---|
| Example 6 | 31.8 | 1.00 |
| Example 7 | 33.8 | 1.09 |
| Example 8 | 28.5 | 1.29 |
| Example 9 | 30.2 | 1.07 |
| Example 10 | 27.2 | 3.94 |

TABLE 3

|  | Static capacity [F/g] | AC resistance [Ω] |
|---|---|---|
| Example 6 | 29.0 | 5.67 |
| Example 7 | 28.7 | 6.11 |
| Example 8 | 28.2 | 7.93 |
| Example 9 | 30.1 | 6.29 |
| Example 10 | 9.5 | 13.28 |

3. Production of Porous Carbon Material (Part 2)

Examples 11 to 17

The following will show properties of the porous carbon materials of Example 11 to Example 17 synthesized by using commercially available aSiC as a raw material, mixing SiO$_2$ fine particles therewith, and subsequently performing a thermal treatment under a chlorine atmosphere.

αSiC (manufactured by Kojundo Chemical Laboratory Co., Ltd., particle diameter: from 3 to 4 µm) was used as a SiC raw material. As SiO$_2$ raw materials, used were vapor-phase process silica fine particles (AEROSIL (registered trademark) 380, AEROSIL (registered trademark) 200, and AEROSIL (registered trademark) 50, manufactured by Nippon Aerosil Co., Ltd.). Incidentally, the number attached to AEROSIL (registered trademark) represents specific surface area of particles. Each particle diameter converted as spherical particles is as shown in Table 4.

TABLE 4

| Item name | Specific surface area [m²/g] | Particle diameter [nm] |
|---|---|---|
| AEROSIL (registered trademark) 50 | 50 | 50 |
| AEROSIL (registered trademark) 200 | 200 | 14 |
| AEROSIL (registered trademark) 380 | 380 | 7 |

SiC/SiO$_2$ mixed raw materials were prepared by using SiO$_2$ in an amount of any of 2.5, 5, and 10% by weight relative to SiC, mixing them by wet mixing using pure water as a medium for 10 minutes or more, and subsequently drying the resultant at 100° C. SiO$_2$ having a particle diameter of any of 50, 14, and 7 nm was used.

The above-described SiC/SiO$_2$ mixed raw materials were subjected to a heat treatment at any temperature of 900, 1,000, and 1,100° C. under a chlorine gas atmosphere for 2 hours. Then, 0.1 g of the resulting porous carbon material was dried in vacuo at 200° C. and was evaluated on a nitrogen adsorption apparatus (NOVA1200 manufactured by QuantaChrome Company) to obtain a nitrogen adsorption isotherm. The specific surface area and the volume of pores of 40 Å or less of the porous carbon material were calculated from the obtained nitrogen adsorption isotherm by BET method and QSDFT method. Moreover, the porous carbon material was subjected to a heat treatment at 600° C. in the atmospheric air until carbon was completely combusted and removed, and SiO$_2$ that remained in the heat treatment under the chlorine gas atmosphere was recovered and the weight thereof was measured, thereby calculating the residual ratio of SiO$_2$ contained in the raw material.

Table 5 shows the treatment temperature under the chlorine gas atmosphere, the particle diameter of SiO$_2$, the mixing amount of SiO$_2$, the residual ratio of SiO$_2$, the specific surface area, and the volume of pores of 40 Å or less, of each of the porous carbon materials of Example 11 to Example 17. Moreover, as a comparison, a case where SiO$_2$ was not mixed is shown as Example 18.

TABLE 5

| | Treatment temperature [° C.] | SiO$_2$ particle diameter [nm] | SiO$_2$ mixing amount [wt %] | SiO$_2$ residual ratio [mol %] | Specific surface area [m²/g] | Pore volume [cc/g] |
|---|---|---|---|---|---|---|
| Example 11 | 1,000 | 7 | 5 | 1.7 | 1,100 | 0.46 |
| Example 12 | 1,000 | 14 | 5 | 1.0 | 1,420 | 0.63 |
| Example 13 | 1,000 | 50 | 5 | 2.0 | 810 | 0.45 |
| Example 14 | 900 | 14 | 5 | 1.0 | 1,080 | 0.48 |
| Example 15 | 1,100 | 14 | 5 | 0.9 | 1,770 | 0.98 |
| Example 16 | 1,000 | 14 | 2.5 | 0.7 | 825 | 0.51 |
| Example 17 | 1,000 | 14 | 10 | 1.7 | 1,180 | 0.62 |
| Example 18 | 1,000 | none | none | 0.0 | 1,250 | 0.51 |

From Table 5, it was confirmed that even in the case where oSiC was used as a raw material and silica fine particles were mixed, a porous carbon material having a large pore volume was obtained in one step of the heat treatment step under the chlorine gas atmosphere without performing an activation treatment step.

Effect of SiO$_2$ Particle Size

In Example 11 to Example 13, an influence of SiO$_2$ particle diameter of the SiC/SiO$_2$ mixed raw material on pore properties was evaluated. The treatment temperature by the chlorine atmosphere gas was fixed to 1,000° C. for 3 hours, and the particle diameter of the mixed SiO$_2$ was changed among three levels, that is, any of 50, 14, and 7 nm.

Effect of Treatment Temperature

In Examples 11, 14 and 15, an influence of the treatment temperature of the SiC/SiO$_2$ mixed raw material under the chlorine gas atmosphere on pore properties was evaluated. The treatment temperature by the chlorine atmosphere gas was any of 900, 1,000, and 1,100° C., the treatment time was 3 hours, the particle diameter of mixed SiO$_2$ was fixed to 14 nm, and the SiO$_2$ mixing amount was fixed to 5% by weight.

Effect of SiO$_2$ Mixing Amount

In Examples 11, 16, and 17, an influence of the SiO$_2$ mixing amount of the SiC/SiO$_2$ mixed raw material on pore properties was evaluated. The treatment temperature by the chlorine atmosphere gas was 1,000° C., the treatment time was 3 hours, the particle diameter of the mixed SiO$_2$ was fixed to 14 nm, and the SiO$_2$ mixing amount was changed to any of 2.5, 5, and 10% by weight.

From Table 5, the following can be confirmed.

As for the particle diameter of the mixed SiO$_2$, the specific surface area becomes maximum in the case of 14 nm. In the case where the particle diameter is too large, it is considered that, since the contact points of the particles decrease, the reaction is less prone to proceed and thus, an increase in the pore amount is suppressed. In addition, in the case where the particle diameter is too small, sintering of the SiO$_2$ particles proceeds before the reaction and thus, there may be considered a decrease in the contact points with carbon and an effect that SiO$_2$ formed on the surface blocks the reaction with chlorine.

Unless the treatment temperature is 1,000° C. or higher, an increase in the specific surface area and the pore amount is not observed.

The SiO$_2$ mixing amount has an optimum value and, in the present investigation, 5% by weight was proper. The reason is considered as follows: in the case where the mixing amount is too large, SiO$_2$ particles that do not contribute to the reaction are present and SiO$_2$ particle that do not contribute to the specific surface area remain in a large amount. In addition, in the case where the amount of SiO$_2$ is small, it is considered that, since a convey-contact amount is small, the specific surface area and the pore volume do not increase.

4. Evaluation of Static Capacity and AC Resistance of Electric Double-Layer Capacitor Using Porous Carbon Material (Part 2)

Example 19

An electric double-layer capacitor of Example 19 was manufactured in the same manner as in Example 6 except that the porous carbon material of Example 15 was used. Table 6 shows the static capacity and AC resistance determined under a condition of 25° C. In the electric double-layer capacitor of Example 19, an increase in the static capacity at ordinary temperature and a reduction in the AC resistance were confirmed and thus it was confirmed that the capacitor showed good properties as an electric double-layer capacitor.

TABLE 6

|  | Static capacity [F/g] | AC resistance [Ω] |
|---|---|---|
| Example 19 | 30.0 | 1.02 |

While the present invention has been described in detail and with reference to specific embodiments thereof, it will be apparent to one skilled in the art that various changes and modifications can be made therein without departing from the spirit and scope thereof.

The invention claimed is:

1. A method for producing a porous carbon material comprising:
a step of subjecting a mixture comprising inorganic carbide particles and inorganic oxide particles to a heat treatment under a chlorine gas atmosphere,
wherein the inorganic oxide particles have an average particle diameter of smaller than 20 nm and are amorphous.

2. The method for producing a porous carbon material according to claim 1,
wherein the mixture comprises the inorganic oxide in a ratio of 3 mol % or more and 8 mol % or less relative to the total of mass amounts of the inorganic carbide and the inorganic oxide in the mixture.

3. The method for producing a porous carbon material according to claim 1,
wherein the inorganic oxide particles have an average particle diameter of smaller than 15 nm.

4. The method for producing a porous carbon material according to claim 1,
wherein the inorganic oxide particles have an average particle diameter of larger than 8 nm.

5. The method for producing a porous carbon material according to claim 1,
wherein the heat treatment is performed at 1,000° C. or higher.

6. The method for producing a porous carbon material according to claim 1,
wherein the heat treatment is performed at 1,000° C. or higher and 1,300° C. or lower.

7. The method for producing a porous carbon material according to claim 1,
wherein the inorganic carbide is SiC and the inorganic oxide is $SiO_2$.

8. The method for producing a porous carbon material according to claim 7,
wherein the SiC has a particle diameter of 5 μm or less.

9. The method for producing a porous carbon material according to claim 7,
wherein the SiC has a β-type crystal structure and the SiC has a specific surface area calculated by BET method from its nitrogen adsorption isotherm being 10 $m^2$/g or more.

10. The method for producing a porous carbon material according to claim 1,
wherein the inorganic carbide is SiC and the inorganic oxide is amorphous $SiO_2$.

11. The method for producing a porous carbon material according to claim 1,
wherein the mixture comprises the inorganic oxide in a ratio of 2 mol % or more and 12 mol % or less relative to the total of mass amounts of the inorganic carbide and the inorganic oxide in the mixture.

* * * * *